United States Patent [19]

Beaudoin et al.

[11] 3,968,702
[45] July 13, 1976

[54] CENTRIFUGALLY CONTROLLED EXPANSIBLE PULLEY WITH MANUALLY ENGAGED NEGATIVE TORQUE RESPONSIVE MEANS

[75] Inventors: Guy Beaudoin, Drummondville South; Marcel Vincent, Wickham, both of Canada

[73] Assignee: Skiroule Ltee, Wickham, Canada

[22] Filed: Jan. 14, 1975

[21] Appl. No.: 541,072

[52] U.S. Cl. .................. 74/230.17 E; 74/230.17 M
[51] Int. Cl.² .......................................... F16H 55/52
[58] Field of Search ............ 74/230.17 E, 230.17 A, 74/230.17 R, 230.17 B, 230.17 M, 217 CV, 336

[56] References Cited
UNITED STATES PATENTS

| | | | |
|---|---|---|---|
| 3,597,987 | 8/1971 | Kiekhaefer | 74/230.17 E |
| 3,812,731 | 5/1974 | Sugimoto et al. | 74/230.17 E |

Primary Examiner—Samuel Scott
Assistant Examiner—A. Russell Burke

[57] ABSTRACT

A variable diameter pulley including a pair of pulley flanges axially displaceable one relative to the other along a shaft, centrifugally responsive weights acting on one flange to cause axial displacement thereof, a pusher ring interposed between the actuating weights and the axially displaceable flange, a centrifugal weight carrier transmitting the rotation of the shaft to the axially displaceable pulley flange. This variable diameter pulley is characterized by driving the displaceable flange through follower blocks and guideways at the periphery of the displaceable flange and the centrifugal weight carrier rather than spline connection to the shaft for reduced angular vibration, noise and wear. There are two sets of guideways and the blocks can engage one or the other of these two sets but not both simultaneously. The guideways of one set are parallel to the shaft axis so that movement of the displaceable flange is effected only by the centrifugal weights whereby the pulley is purely centrifugally responsive. The guideways of the other set are oblique to the shaft axis in a direction to move the displaceable flange away from the fixed flange so as to obtain a negative torque reaction which opposes and retards the centrifugally responsive action on the displaceable flange resulting in a pulley that is negatively responsive to torque and positively responsive to centrifugal action.

6 Claims, 4 Drawing Figures

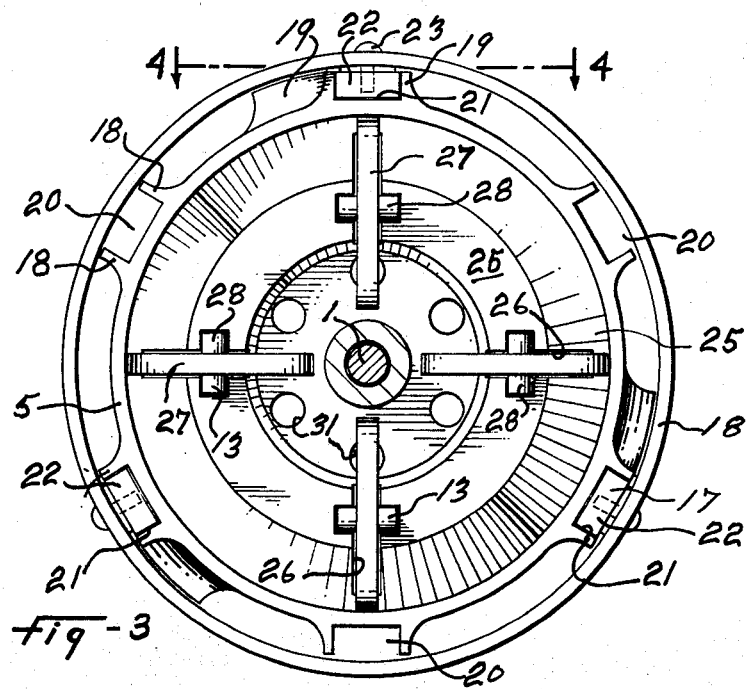
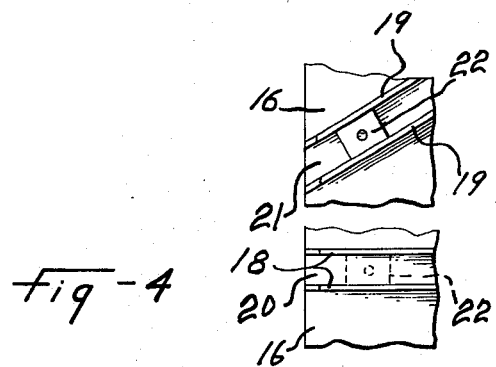

CENTRIFUGALLY CONTROLLED EXPANSIBLE PULLEY WITH MANUALLY ENGAGED NEGATIVE TORQUE RESPONSIVE MEANS

This invention relates to a pulley of the type having a pair of pulley flanges adapted to be axially moved toward and away one from the other to vary the effective engagement of a belt therewith. A pulley of this type finds particular application in a snowmobile.

The anteriorly proposed pulleys of the above type reveal that other desiderata concerning the operation of such pulleys have not been met and that further functional and structural advantages may be imparted to such pulleys. In particular, the axially displaceable pulley flange is conventionally driven by spline connection to the pulley shaft and this results in substantial angular vibration, noise and wear.

It is a general object of the present invention to provide a variable diameter pulley wherein the axially displaceable flange is more effectively and advantageously driven and, in particular, with relatively less angular vibration, less noise and reduced wear.

It is a more specific object of the present invention to provide a variable diameter pulley of the above type which is driven through the periphery thereof rather than through the hub thereof.

It is a further object of the present invention to provide a variable diameter pulley of the above type, which includes a drive for the axially displaceable pulley flange which is adapted to produce a recessive axial action on the axially displaceable flange resulting in a pulley which is negatively responsive to torque and positively responsive to centrifugal action.

It is a further specific object of the present invention to provide a variable diameter pulley of the above type, wherein the axially displaceable flange is driven through follower blocks and thru one or the other of two sets of guideways at the periphery of the displaceable flange; the guidways of one set are parallel to the shaft axis to obtain a pulley which is purely centrifugally responsive; the guidways of the other set are oblique to the shaft axis in a direction to move the displaceable flange away from the fixed flange by torque exerted on the shaft so as to obtain a negative torque responsive action on the pulley flange resulting in a pulley which is both negatively responsive to torque and positively responsive to centrifugal action.

The above and other objects and advantages of the present invention will be better understood by the following description of a preferred embodiment thereof which is illustrated, by way of example, in the accompanying drawings, wherein:

FIG. 3 is a cross-sectional view as seen along line 3—3 in FIG. 1; and

FIG. 4 is a developed plan view of peripheral portions of the centrifugal weight carrier forming part of the pulley of the preceding figures.

Figure 1:
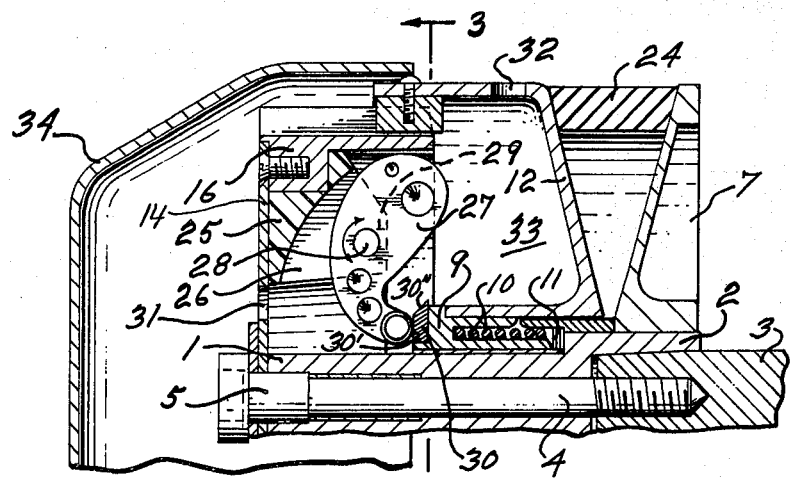
FIG. 1 is an axial cross-sectional view through a variable diameter pulley having an axially displaceable flange shown under full centifugal weight action thereon according to the present invention.

The illustrated variable diameter pulley includes a shaft 1 having an axially bored end 2 engaging on the end of a driving shaft 3. The pulley shaft 1 is fixed to the driving shaft 3 by a bolt 4 extending through a bushing 5. The axially bored end 2 is of larger diameter than the remainder of the pulley shaft and forms an annular shoulder 6 constituting an axial abutment or stop, the function of which will be better defined later.

A pulley flange 7 is rigidly fixed on the bored end 2 for rotation with the pulley shaft 1 and in axially fixed position relative to the latter. A sleeve 8 is also rigidly fixed on the bored end 2 and projects axially away from the pulley flange 7. Another sleeve 9 is rotatably and slidably mounted on the pulley shaft 1. The sleeves 8 and 9 cooperatively form an annular space with each other in which is contained a compression spring 10. Shims 11 are positioned against the annular shoulder or stop 6 with the spring 10 in abutment therewith. As seen in FIG. 1, the shims 11, in cooperation with the axial stop 6, limit the axial displacement of the sleeve 9 toward the fixed pulley flange 7, such as to provide a minimum clearance between the axially displaceable pulley flange 12 and the fixed flange 7. The pulley flange 12 is fixed to the sleeve 9 for bodily axial and rotational displacement therewith. The axially displaceable flange 12 is formed with a cylindrical skirt portion 13 at the periphery thereof.

A circular drive plate 14 is clamped against the end of the pulley shaft 1 by the bolt 4 and the washer 15. A sleeve 16 is secured peripherally to the drive plate 14 by screws 17, or other suitable expedient, and projects from the drive plate toward the pulley flanges 7 and 12. Thus, the cylindrical skirt portion 13 circumscribes the sleeve 16 in radially spaced apart relationship. The sleeve 16 is formed with ridges 18 and 19 against the external cylindrical surface thereof. These ridges 18 and 19 project longitudinally of the axis of the pulley. In particular, the ridges 18 extend parallel to the axis of the pulley and thus form similarly projecting grooves or guideways 20. The ridges 19, instead, extend at an oblique angle to the axis of the pulley and form similarly projecting grooves or guideways 21. In other words and as illustrated, the grooves 21 extend at an angle or obliquely and symmetrically relative to the generatrix of the external cylindrical surface and in a predetermined direction relative to the direction of rotation of the centrifugal weight carrier. Thus, as illustrated in FIG. 4 the grooves 21 extend at an angle or obliquely and symmetrically relative to the set of grooves 20. As shown in FIG. 3, the grooves 21 alternate with the grooves 20 around the circumference of the external cylindrical surface. A follower block or pad 22 is selectively engaged in each groove 20 or 21, thus follower block 22 can engage one or the other of two sets of grooves 20 and 21 but not both sets simultaneously. It must be noted that the blocks 22 are pivotally mounted against the inner face of the cylindrical skirt 13, by rivets 23, to thereby allow selective engagement in the grooves 20 or 21.

As shown in FIG. 3, there are three follower blocks 22 spaced along the circumference of the cylindrical skirt 13 and engaged in the set of three corresponding grooves 21. It must be noted that the afore-mentioned selective engagement of the blocks or pads 22 in the grooves 20 is made upon assembly of the pulley such that the blocks would stand in the set of grooves 20 instead of in the set of grooves 21.

The drive plate 14 and sleeve 16 thus drive the pulley flange 12 at the periphery thereof and the required clearances of the blocks 22 in the grooves produce less angular vibration and noise than the conventional splined drive through the hub of the pulley flange, since the same clearances are farther from the rotation axis and thence reduce the possible angular play. Preferably, the blocks or pads 22 are made of nylon, plastic, rubber or the like, which further enhances the reduction of noise.

It must be noted that the afore-mentioned angle of the grooves 21 relative to the generatrix is chosen to produce a predetermined axial component of force by driving action of the grooves 21 against the follower members or pads 22 upon acceleration of the drive plate 14 bodily rotating with the sleeve 16. This axial component of force is of such magnitude and direction to induce a recessive axial action on the blocks 22 and, consequently, on the axially displaceable flange 12.

A carrier member or body 25, made of a block of plastic or the like, is positioned against the circular plate 14 inside the sleeve 16. This carrier member or body 25 is urged by action of the spring in friction drive engagement with the inner face of the circular plate 14, such as to allow some angular shifting of the carrier member or body 25 relative to the circular plate upon acceleration of the latter. The carrier member 25 is formed with four radial slots 26, each having a centrifugally responsive weight or lever 27 pivoted therein by a pin 28 engaged in a corresponding open notch 29. The weights 27 may thus be readily inserted in the notches 29, which are axially extending relative to the axis of the pulley.

A pusher ring 30, of wear-resistant material, is removably engaged on the sleeve 9 for rotation therewith. The pusher ring 30 has opposite sides or faces made with dissimilar radial contours; in this case, a completely straight line contour on one face and a broken line contours on the other face defining inner face 30' and outer bevelled face 30''. The pusher ring 30 is engaged by the weights 27 whose pivotal movement upon increasing centrifugal action produces axial displacement of the ring and the displaceable flange 12 toward the axially fixed flange 7.

As aforementioned, the carrier member 25 is angularly shifted due to inertia relative to the drive plate 14 and, consequently, also relative to the pusher ring 30. Thus, the points of contact of the weights 27 with the ring 30 are similarly angularly varied, resulting in more even wear of the pusher ring 30 and longer life of the latter.

Figure 2:
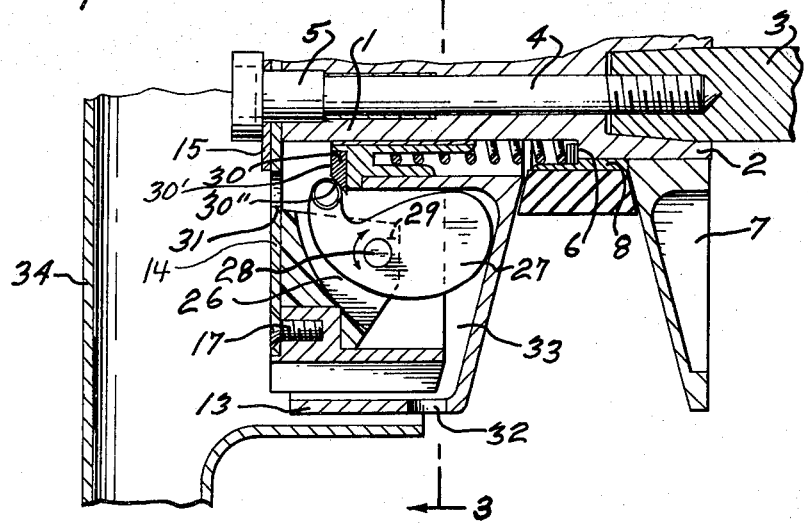
FIG. 2 is a view as in FIG. 1 but with the axially displaceable pulley flange fully de-actuated or in the idle position.

The pusher ring 30 may be reversed to selectively present one of the two radially contoured faces to the weights 27. For normal operation, the completely flat face is presented. When the opposite face is presented, as shown in the drawings, the inner end of weights 27 engage bevelled face 30'' in the rest position of the pulley, as shown in FIG. 2. With increase in pulley speed, the inner end of weights 27 has to move up the bevelled faces 30'' to engage the perpendicular face portion 30'; thus, clutching takes place at a higher speed than normally. In the closely spaced apart position of the pulley flanges, as shown in FIG. 1, the inner end of each weight still engages perpendicular face portion 30'. The angle of bevelled face portion 30'' may vary between about ½° and 90° with respect to face portion 30'. The greater the angle, the higher will be the speed at which clutching takes place. The rate of axial response of the displaceable pulley flange 12 may thus be preset according to the need.

The circular plate 14 is provided with air inlet ports or apertures 31, while the skirt 13 of the displaceable flange is provided with air outlet ports or apertures 32 arranged radially outwardly of the inlet ports 31. The centrifugal weight carrier formed of the drive plate 14; the sleeve 16; and the carrier member or body 25 forms an annular space 33 in connection with the displaceable flange 12. This arrangement causes the flat weights 27 to act as vanes producing radially outward ventilation by air intake through the inert ports 31, air flow in the annular space 33 and air exit through the outlet ports 32. This air flow cools the pulley itself and, in a snowmobile, is taken from outside the engine hood by a duct 34 and is circulated inside this hood to cool the engine and other driven parts. This is important, since it permits to close the hood to reduce noise while allowing proper cooling of the engine.

The shims 11 may be removed in relation to the wear of the belt 24, to allow the sleeve 9 and the flange 12 to bodily move closer to the axially fixed pulley flange and thus compensate for the wear of the belt and, consequently, produce a pulley which retains the same performance characteristics during the life of the belt.

We claim:
1. A variable diameter pulley comprising shaft means, a first and a second pulley flanges coaxially mounted on said shaft means, said first pulley flange being axially displaceable along said shaft means, a centrifugal weight carrier having a part fixedly secured to said shaft means, bodily rotatable therewith, and including an external circumferential surface having axially extending guideways thereon, centrifugal weights pivotally mounted on another part of said carrier and operatively engaging said first pulley flange for axial displacement of the latter, and follower members secured to the periphery of said first pulley flange for axial displacement therewith in slidable and non-rotatable engagement with said guideways respectively, and axially displaceable bodily with said first pulley flange along said guideways in response to centrifugal action on said centrifugal weights.

2. A variable diameter pulley as defined in claim 1, wherein said guideways extend obliquely relative to the generatrix of said external circumferential surface and in the same predetermined angular direction relative to the generatrix and to the direction of rotation of said carrier, whereby to induce recessive axial action on said first pulley flange upon driving action of the guideways on the follower members.

3. A variable diameter pulley as defined in claim 2, wherein said guideways constitute a first set of guideways, a second set of guideways extend parallel to the generatrix of said outer circumferential surface and said follower members are selectively engageable with the guideways of either of said sets of guideways.

4. A variable diameter pulley as defined in claim 3, wherein said follower members constitute low friction pads removably secured to said first pulley flange.

5. A variable diameter pulley as defined in claim 3, wherein said follower members constitute low friction pads pivoted to said first pulley flange about axes extending radially of the latter.

6. A variable diameter pulley as defined in claim 5, wherein said guideways constitute grooves and said pads are freely slidable along said grooves.

* * * * *